June 7, 1966  E. J. ZAHURANEC  3,254,399

BULKHEAD SUPPORT AND FASTENING MEANS

Filed Nov. 23, 1962

INVENTOR.
EMERY J. ZAHURANEC

BY

*Fay & Fay*

ATTORNEYS

United States Patent Office 3,254,399
Patented June 7, 1966

3,254,399
BULKHEAD SUPPORT AND FASTENING MEANS
Emery J. Zahuranec, Bedford, Ohio, assignor to Crawford Fitting Company, Cleveland, Ohio, a corporation of Ohio
Filed Nov. 23, 1962, Ser. No. 239,422
1 Claim. (Cl. 29—407)

This invention relates to a novel support and holding means. Further, it encompasses a method and tool means for facilitating easy installation of said support means.

Modern-day fluid-handling systems involve a maze of conduits extending from control panels to machines and throughout the structure housing such systems. Inevitably, it is necessary for such fluid lines to pass through the walls of the building, bulkheads of ships, machine walls, control panel walls, and the like. Considerable difficulty has been encountered where such a juncture is to be made. Often the situation demands a particular type of wall fitting, known in the art as a bulkhead fitting, where the incoming conduit may be connected on one side of the wall and the outgoing conduit connected on the other side of the wall. The fitting has a shank which is of sufficient length to pass through the wall. In positioning the fitting through the wall, it is generally necessary to employ two workmen, one workman to remain on one side and hold the fitting from rotating while the other workman is on the other side with a suitable tool means advancing the nut to hold the fitting tightly in the wall. An analogous situation arises when it becomes necessary to connect the conduits to the wall fitting. For convenience of description, the term "bulkhead" will be used to describe the wall members, such terminology including walls, ceilings, panels, machine covers, plates, housings, and like structures. Similarly, the support and holding means will be referred to hereinafter as a support means.

Modern-day labor rates being high for semi-skilled workers, such as pipe fitters, plumbers and the like, who generally install fluid handling systems, it is essential that every effort be made to reduce labor requirements whereever possible. To the attainment of this end, a novel fastener and support means has been developed which will enable a single workman to install a wall fitting by himself through the use of the novel support and holding means of the instant invention.

The simplicity in design gives rise to economical manufacturing, thereby rendering it economically feasible to utilize the invention when compared on a cost basis to similar structures or the cost of labor utilizing conventional tools.

The novel method of installing the support means may be rapidly performed with a minimum amount of effort and tools. Moreover, an economical installation jig is provided whereby it is virtually impossible to misalign the support holding means of the instant invention with respect to the fitting receiving hole through the bulkhead. The jig which is used to perform the aligning function is exceedingly simple in design, which makes it economical to manufacture. However, despite its simplicity, it is exceedingly accurate in achieving the intended purpose.

The novel bulkhead support means of the instant invention presents several distinct advantages when used in the intended manner. First, it may be quickly and conveniently installed. Second, it serves the function of supporting the assembled fluid line, including the fitting, while permitting the fitting to be removed, replaced, or the like, without requiring a new support means. Moreover, it serves the function of preventing rotation of the body portion of the wall fitting during rotation of the conduit connecting fittings. It continues to serve this holding function so that the conduits may be connected and disconnected at will, without requiring more than a single tool means which is employed in rotating the conduit fitting. Further, it eliminates the necessity of providing polygonal shoulders on the wall fitting on both sides of the bulkhead. Further advantages of the instant device will become readily apparent upon recitation of the objects and the attendant description of the structure to achieve the same.

It is, therefore, a general object of this invention to provide a novel support means.

It is a further object of this invention to provide a support means which is simple in design, convenient to manufacture, and easy to install.

It is a further object of the invention to provide a novel jig for positioning the support means.

It is a further object of the invention to provide a novel method and jig to assist in preparing the bulkhead for reception of the support means.

It is a still further object of this invention to provide a support means which is easily installed, and once installed, will serve to support the fitting for the life of the system, while restraining attempts to rotate the same.

Further and fuller objects will become readily apparent when reference is made to the accompanying drawings wherein.

THE INVENTION

Figure 1:
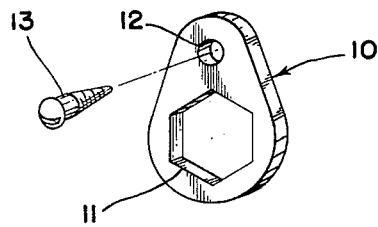
FIG. 1 is a perspective view of the support means with a self-seating fastener adjacent thereto.
Figure 2:
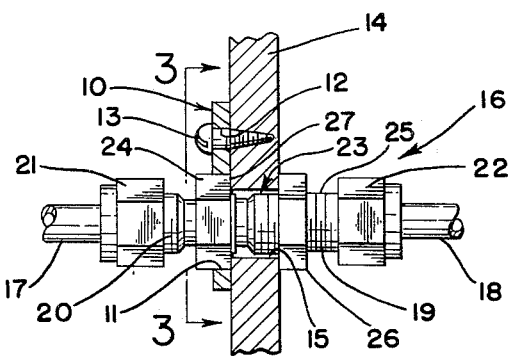
FIG. 2 is a cross-sectional view of a fitting passing through a fragment of wall with parts of the wall and support means in cross section.
Figure 3:
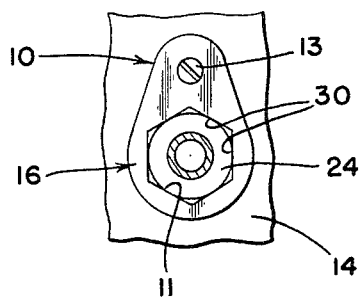
FIG. 3 is a view taken along the lines 3—3 of FIG. 2.

Referring now to FIGS. 1 to 3, the fastener 10 has a pair of apertures 11 and 12 therethrough. The aperture 12 is of such diameter as to receive the self-seating fastener 13. The aperture 11 is of a polygonal configuration for purposes hereinafter described. A fragmentary portion of a wall 14 is shown as having an aperture 15 therethrough. A fitting indicated generally at 16 extends through the aperture 15. The fitting provides a fluid path for fluid flowing through the conduits indicated fragmentarily at 17 and 18, respectively. The fitting has connecting portions 19 and 20, and connecting fittings which in the instant embodiment, are contemplated as being sold under the name "SWAGELOK" by Crawford Fitting Company of Cleveland, Ohio. The connecting portions 19 and 20 are assembled at the factory with the swage nuts 21 and 22 in a hand-tight position. Connection to the conduits 17 and 18 is had by merely inserting the conduit and rotating the swaging nuts 21 and 22. The connecting portions 19 and 20 of the fitting join the conduits through a central body portion indicated generally at 23. The central body portion 23 is of a diameter which is somewhat less than the diameter of the aperture 15 to facilitate easy insertion therethrough. The diameter of the swage nuts 21 and 22 across the flats is substantially less than a like measurement of the aperture 11.

Integral with the body portion 23 is a raised shoulder 24 which is of a diameter greater than the diameter of the aperture 15. The shoulder portion 24 is of a polygonal configuration corresponding to the polygonal configuration of the aperture 11 of the support means 10. The support means 10 is shown in section with a single self-seating fastener 13 inserted in the bulkhead 14. It is contemplated that additional fasteners could be provided if necessary or desirable. On the side of the wall opposite the shoulder 24, a threaded portion 25 of the body 23 receives a jam nut 26. The jam nut is rotated on the threads 25 so as to keep the radial surface 27 of the shoulder 24 in engagement with the wall 14. Thus the fitting is held from longitudinal movement relative to the bulkhead 14. The support means 10 serves to hold the fitting in a radial plane while preventing rotation of the integral shoulder 24. The body portion 23 is thus prevented from moving angularly when the jam nut 26 or swaging nuts 21 and 22 are rotated.

The angular holding function of the fastening means can be best seen with particular reference to FIG. 3. Therein it can be seen that the polygonal portions 30 of the aperture 11 are aligned with the polygonal portions on the shoulder 24 to prevent relative rotation thereof. The self-seating screw 13 is positioned a sufficient distance from the aperture 11 so as to enable it to resist any turning moments transmitted to the support means 10. It is contemplated that any type of penetrating or self-seating fastener could be used. It is further obvious that the space 31 could accomodate suitable packing of conforming configuration should such be desired.

THE METHOD AND TOOL FOR INSTALLING

Figure 4:
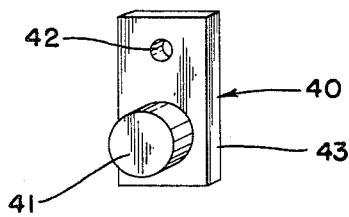
FIG. 4 is a perspective view of the jig used in the installation of the support means.
Figure 5:
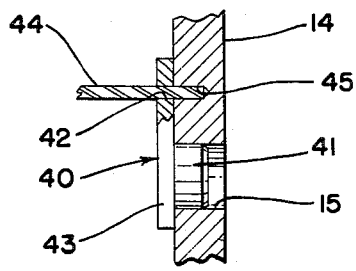
FIG. 5 is a cross-sectional view through the bulkhead illustrating the jig in position and a fragmentary portion of a drill through the jig hole.

With particular reference to FIGS. 4 and 5, the novel method and tool for installing the fastener will now be described. The wall 14 is provided with an aperture 15 by drilling, punching, or any suitable process. It is contemplated where steel bulkheads are encountered, drilling will be the most suitable unless the bulkhead has preformed holes to accommodate such fittings, as might be found in an instrument control panel or the like. In the latter case the holes may be punched at the time of manufacture of the control panel.

The tool 40 is provided with a raised boss 41, which is almost equal in diameter to the aperture 15. A hole 42 is provided in the body portion 43 of the jig 40. The raised boss portion is inserted in the aperture 15 and a drill 44 may pass through hole 42. The hole 42 is accurately spaced from the center of the boss 41 a distance equal to the distance from the center of the aperture 11 to the center of the aperture 12 of the fastening means 10. A recess or pilot hole 45 is drilled part way into the bulkhead 14. The drill 44 and the jig 40 are removed. The fitting 16 is then inserted through the aperture 15 and the fastening means 10 is slipped over the swaging nut 21 and over the shoulder 24 to conform therewith. The self-seating fastener indicated at 13 is then inserted in the aperture 45 made by the drill 44. The jam nut 26 can then be drawn up by a single man working on that side of the wall. No additional laborers or other means is required to hold the fitting during the connecting operation. The conduits 17 and 18 may be inserted and the swage nuts 21 and 22 rotated without the attendant danger of the jam nut 26 becoming loose due to rotation of the fitting. It is essential to note that considerable torques are required to swage the connecting portions at 19 and 20. In the absence of the novel support means 10, there is always danger that the fitting will rotate within the wall, thereby becoming loose, giving rise to chattering and hammering of the system. Moreover, the use of the supporting means 10 allows the weight of the system to be supported through the shoulder 24 which is substantial when compared with the body portion 23 so that the danger of damage to the line due to external forces, fatigue, and the like is considerably lessened.

Although a single preferred embodiment has been shown, this has been done only in the interests of clarity and ease of description. It is not intended that this be limiting; however, rather it is intended that the scope of the invention be limited only within that defined by the scope of the appended claim.

I claim:

The method of installing a fitting nonrotatably in an aperture in a wall comprising the steps of:

forming a hole of a predetermined diameter in said wall, providing a jig comprising a plate having an aperture therethrough and a raised boss portion spaced from said aperture extending substantially perpendicular from the surface of said plate with the diameter of said boss portion being substantially equal to the diameter of the hole in said wall, positioning the raised boss portion of the jig in the hole in said wall with the periphery of said boss closely mating with the periphery of the hole in said wall, providing a drill having a drill bit of a diameter substantially equal to the diameter of the aperture in said jig, inserting the drill bit in the aperture in said jig, actuating the drill while retaining the boss in the hole in said wall thereby to form a pilot hole in said wall at a location accurately spaced from said first mentioned hole, removing the drill bit from the aperture in the jig, removing the raised boss portion of the jig from said hole in said wall, selecting a fitting comprising an elongated body having an out-of-round shoulder thereon and thread means extending longitudinally over a portion of said body spaced from said shoulder and nut means at either end of said body adapted to secure fluid conduits thereto, with the diameter of the body of said fitting being less than the diameter of the hole in said wall and the diameter of said shoulder means being greater than the diameter of the hole in said wall, inserting the body of the fitting through the hole in said wall until said shoulder engages one side of said wall with the threaded portion on said body extending through to the other side of said wall, providing an apertured bulkhead support means comprising a substantially flat plate having a pair of spaced apertures therethrough with the first of said apertures being generally cylindrical in configuration and having a diameter substantially equal to the diameter of the pilot hole in said wall and with the second aperture being of a noncylindrical configuration adapted to mate with the out-of-round configuration of said shoulder on said fitting, applying said apertured bulkhead support means over the end of said fitting on said one side of said wall by passing said fitting through said second aperture in said support means, aligning said first aperture in said bulkhead support means with said pilot hole in said wall and engaging said second aperture with said out-of-round shoulder on said fitting, inserting fastening means through said first aperture in said support means into said pilot hole thereby securing said bulkhead support to said wall, providing lock nut means having a thread adapted to engage said thread means on said fitting with the outer diameter of said lock nut means being greater than the diameter of said hole in said wall, threading said lock nut means onto the threaded portion of said body extending through the other side of said wall and tightening the lock nut means against said other side of said wall thereby securing said shoulder nonrotatably in said second aperture in said support means and against said one side of said wall.

(References on following page)

References Cited by the Examiner

UNITED STATES PATENTS

| | | | |
|---|---|---|---|
| 74,376 | 2/1868 | Kellogg | 77—62 |
| 626,488 | 6/1899 | Diehl | 77—62 |
| 1,791,420 | 2/1931 | Mayo | 248—56 |
| 2,065,289 | 12/1936 | Pearce | 248—56 X |
| 2,265,179 | 12/1941 | MacDonald | 285—161 |
| 2,430,809 | 11/1947 | Flora | 248—56 |
| 2,458,670 | 1/1949 | Young | 248—56 |
| 2,640,672 | 6/1953 | Bedford | 285—194 X |
| 2,727,709 | 12/1955 | Weber | 285—192 X |
| 2,934,359 | 4/1960 | Smisko | 285—86 |
| 2,986,409 | 5/1961 | Weber | 285—161 |
| 3,076,627 | 2/1963 | Huron | 285—189 X |
| 3,104,120 | 9/1963 | Myers | 285—161 |

FOREIGN PATENTS 120,013  10/1918  Great Britain.

CARL W. TOMLIN, *Primary Examiner.*

R. A. GIANGIORGI, C. B. FAGAN,
*Assistant Examiners.*